(12) United States Patent
Hong et al.

(10) Patent No.: US 12,339,621 B2
(45) Date of Patent: Jun. 24, 2025

(54) AUGMENTED REALITY HOLOGRAPHIC DISPLAY USING OPTICAL WAVEGUIDE AND HOLOGRAPHIC OPTICAL ELEMENT

(71) Applicant: Korea Electronics Technology Institute, Seongnam-si (KR)

(72) Inventors: Ji Soo Hong, Seoul (KR); Sung Hee Hong, Seoul (KR); Young Min Kim, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 559 days.

(21) Appl. No.: 17/781,101

(22) PCT Filed: Dec. 6, 2019

(86) PCT No.: PCT/KR2019/017165
§ 371 (c)(1),
(2) Date: May 31, 2022

(87) PCT Pub. No.: WO2021/112301
PCT Pub. Date: Jun. 10, 2021

(65) Prior Publication Data
US 2023/0004121 A1    Jan. 5, 2023

(30) Foreign Application Priority Data

Dec. 6, 2019   (KR) .................... 10-2019-0161225

(51) Int. Cl.
*G03H 1/22*   (2006.01)
*G03H 1/04*   (2006.01)

(52) U.S. Cl.
CPC ......... *G03H 1/2286* (2013.01); *G03H 1/0408* (2013.01); *G03H 1/2249* (2013.01);
(Continued)

(58) Field of Classification Search
CPC .... G02B 6/00; G02B 6/0023; G02B 6/29316; G03H 1/2286; G03H 1/0408;
(Continued)

(56) References Cited

U.S. PATENT DOCUMENTS 5,224,198 A * 6/1993 Jachimowicz ......... G02B 6/003
359/13
6,580,529 B1   6/2003 Amitai et al.
(Continued)

FOREIGN PATENT DOCUMENTS

JP       5-304645 A       11/1993
KR   10-2013-0037159 A    4/2013
(Continued)

OTHER PUBLICATIONS

Korean Office Action issued on Jan. 20, 2021, in counterpart Korean Patent Application No. 10-2019-0161225 (4 pages in English and 5 pages in Korean).

*Primary Examiner* — Nathanael R Briggs
(74) *Attorney, Agent, or Firm* — NSIP Law (57) ABSTRACT

Provided is a technology for implementing an AR optical waveguide display capable of showing a hologram image by means of a small and simple system configuration by using an HOE. A holographic display according to an embodiment of the present invention comprises: a light source module for emitting a beam; an optical waveguide through which the emitted beam is incident and propagated; a plurality of holographic optical elements (HOES) for propagating the beam incident to the optical waveguide inside the optical waveguide while totally reflecting the beam; and a modulator for reproducing a holographic image through the progressing beam and propagating the beam to the inside of the optical waveguide while totally reflecting the beam. Accordingly, it is possible to implement, as a small and (Continued)

simple system, an optical waveguide display showing an AR hologram by using an optical waveguide and an HOE.

16 Claims, 8 Drawing Sheets (52) U.S. Cl.
CPC ............... *G03H 2001/0439* (2013.01); *G03H 2001/226* (2013.01); *G03H 2222/12* (2013.01); *G03H 2223/14* (2013.01); *G03H 2223/16* (2013.01)

(58) Field of Classification Search
CPC .. G03H 1/2249; G03H 1/2294; G03H 1/0443; G03H 1/10; G03H 2001/0439; G03H 2001/226; G03H 2001/2284; G03H 2222/12; G03H 2222/54; G03H 2223/12; G03H 2223/14; G03H 2223/16; G03H 2223/17; G03H 2223/23; G03H 2225/52; G06T 19/00; G06T 19/006
See application file for complete search history.

(56) References Cited

U.S. PATENT DOCUMENTS

| 2007/0070504 | A1 | 3/2007 | Akutsu et al. |
| 2014/0160543 | A1* | 6/2014 | Putilin ................. G02B 6/0023 359/9 |

FOREIGN PATENT DOCUMENTS

| KR | 10-2014-0074813 A | 6/2014 |
| KR | 10-2016-0008951 A | 1/2016 |
| KR | 10-2019-0131707 A | 11/2019 |

* cited by examiner

AUGMENTED REALITY HOLOGRAPHIC DISPLAY USING OPTICAL WAVEGUIDE AND HOLOGRAPHIC OPTICAL ELEMENT

CROSS REFERENCE TO RELATED APPLICATIONS

This application is a U.S. National Stage Application of International Application No. PCT/KR2019/017165, filed on Dec. 6, 2019, which claims the benefit under 35 USC 119(a) and 365(b) of Korean Patent Application No. 10-2019-0161225, filed on Dec. 6, 2019, in the Korean Intellectual Property Office, the entire disclosure of which is incorporated herein by reference for all purposes.

TECHNICAL FIELD

The present disclosure relates to a holographic display, and more particularly, to a display which is capable of showing a hologram image by using augmented reality (AR).

BACKGROUND ART

A holographic display may provide an observer with a complete 3D image which satisfies all physiological clues, but a system should be considered to allow a collimated laser beam to enter a complex field, which is able to reproduce both an amplitude and a phase, in order to completely reproduce a desired wave front through diffraction and interference principles based on wave optics.

However, an existing spatial light modulator (SLM) capable of displaying an image may reproduce only an amplitude or a phase. For example, when a holographic display is implemented by using an amplitude-type SLM, a single-sideband encoded hologram image may be displayed on the SLM, and then, a 4f system may be configured as shown in FIG. 1, and a complex hologram should be obtained by filtering only a meaningful signal area through a spatial filter in an angular spectrum domain.

More specifically, a lens 0 and a lens 1 are to expand a laser beam, and $f$ has a relatively larger value than $f0$. The collimated laser beam expanded as described above passes through the amplitude-type SLM, and the complex hologram may be obtained through the 4f-system formed of a lens 2 and a lens 3.

Figure 1:
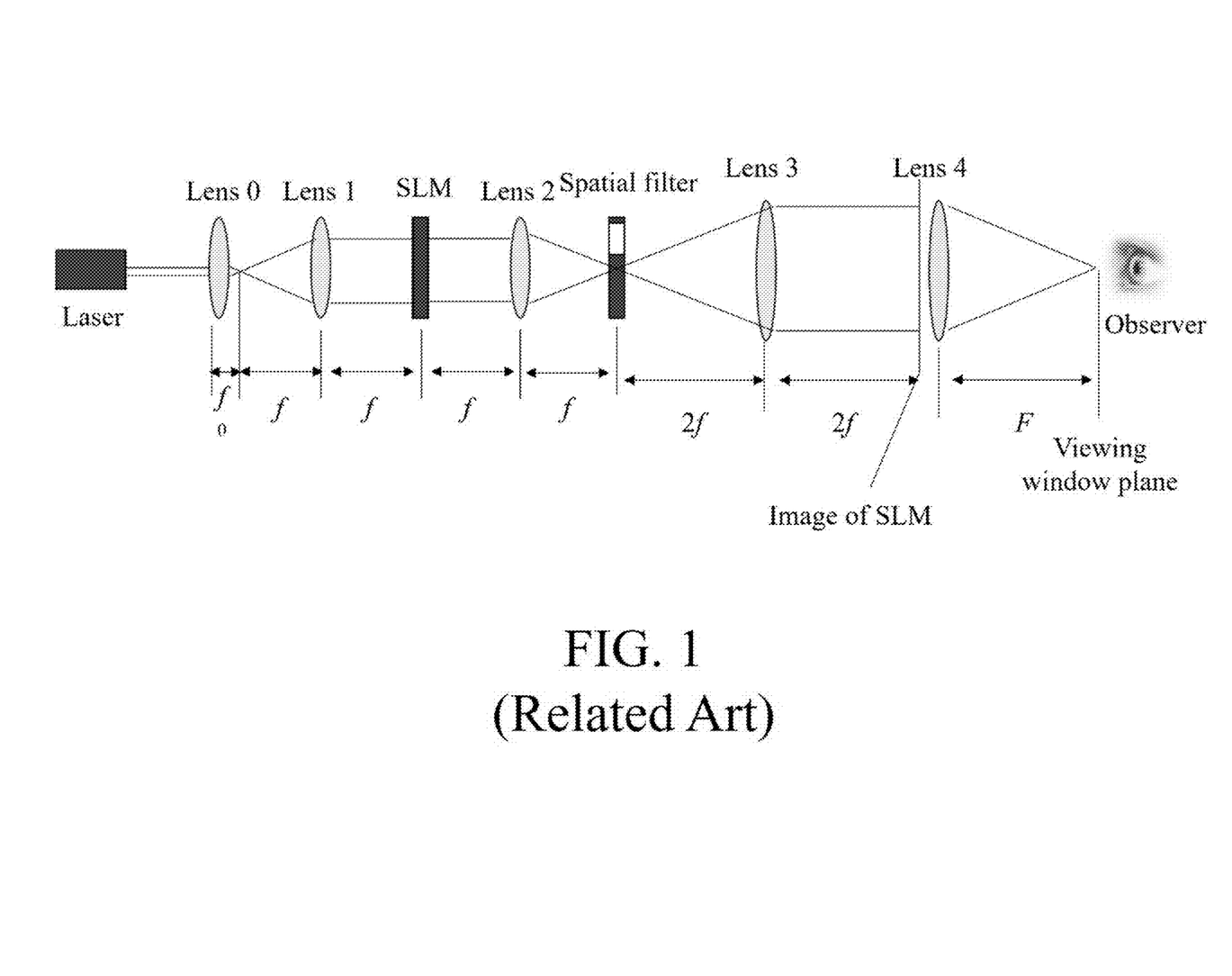
FIG. 1 is a view illustrating a system configuration of a holographic display of a viewing window method.

In this case, an image size of the SLM may be magnified according to a ratio between focal distances of the lens 2 and the lens 3, and in the case of FIG. 1, the lens 2 has a focal distance $f$ and the lens 3 has a focal distance $2f$, such that the 4f system has a magnification of two times.

Since the angular spectrum domain of the SLM image is formed the focal distance $f$ away from the lens 2, the spatial filter may be positioned in this position to allow only a desired signal to pass therethrough.

Thereafter, the beam passing through the lens 3 focuses the image of the SLM on a place that is the focal distance $2f$ away from the lens 3, and in this case, an intended complex field from which DC and a conjugate signal are removed is formed on this plane.

A lens 4 having a focal distance F is positioned on this plane, such that a viewing window is formed at the focal distance of the lens 4, and observer's pupil is positioned on this position, such that the observer can view a hologram image of a viewing window method.

The holographic display of the viewing window method configured as described above may show a complete 3D image, and may provide an augmented reality (AR) image with high reality when it is applied to an AR display. However, since the configuration shown in FIG. 1 has a bulky volume and is complicated, there may be a problem in applying this configuration to an AR display as it is.

DISCLOSURE

Technical Problem

The present disclosure has been developed in order to address the above-discussed deficiencies of the prior art, and an object of the present disclosure is to provide technology for implementing, as a small and simple system configuration, an AR optical waveguide display capable of showing a hologram image by using a holographic optical element (HOE).

Technical Solution

According to an embodiment of the present disclosure to achieve the above-described object, a holographic display includes: a light source module configured to emit a beam; an optical waveguide through which the emitted beam enters and progresses; a plurality of holographic optical elements (HOEs) configured to propagate the beam entering the optical waveguide inside the optical waveguide while totally reflecting the beam; and a modulator configured to reproduce a holographic image on the progressing beam, and to propagate the beam to the inside of the optical waveguide while totally reflecting the beam.

The holographic display according to the present invention may further include a lens configured to converge and then diffuse a beam emitted from a laser, and to allow the beam to enter the optical waveguide, and the HOEs may include a first HOE which is attached to the other side of the optical waveguide to transform a beam, which enters after passing through the lens and being reflected from one side of the optical waveguide, into a parallel beam, and to totally reflect the beam toward the other side of the optical waveguide.

The modulator may be attached to one side of the optical waveguide to reproduce a holographic image on the beam totally reflected from the first HOE and entering, and to totally reflect the beam toward the other side of the optical waveguide.

The HOEs may further include a second HOE which is attached to the other side of the optical waveguide to converge the beam which is totally reflected from the modulator and enters, and to totally reflect the beam toward one side of the optical waveguide.

The HOEs may further include a third HOE which is attached to one side of the optical waveguide to diffuse only part of the beam which is totally reflected from the second HOE and enters, and to totally reflect the beam toward the other side of the optical waveguide.

The third HOE may be divided into: a total reflection area configured to diffuse and totally reflect part of the entering beam toward the other side of the optical waveguide; and a transmission area on which an out-coupler is recorded to transmit the rest of the entering beam to an outside.

The third HOE may make wave fronts simulating respective entering beams, respectively, at an outside, and may allow the wave fronts to enter and may allow a wave front simulating an emitted beam to enter a mask which is attached to an upper portion of the third HOE and is divided into a total reflection area and a transmission area, and to be recorded.

The HOEs may include: a fourth HOE configured to transform the beam, which is totally reflected from the third HOE and then is totally reflected from the other side of the optical waveguide and enters, into a parallel beam, and to totally reflect the beam toward the other side of the optical waveguide; and a fifth HOE configured to converge the beam, which is totally reflected from the fourth HOE and then is totally reflected from the other side of the optical waveguide and enters, to totally reflect the beam toward the other side of the optical waveguide, and then to transmit the beam.

The first HOE, the second HOE, the fourth HOE, and the fifth HOE may make wave fronts simulating an entering beam and a reflected beam, respectively, at an outside, and may allow the wave fronts to enter and to record.

According to another aspect of the present disclosure, there is provided a holographic display method including the steps of: emitting, by a light source module, a beam and allowing the beam to enter an optical waveguide; propagating, by a plurality of holographic optical elements (HOEs), the beam entering the optical waveguide inside the optical waveguide while totally reflecting the beam; and reproducing, by a modulator, a holographic image on the progressing beam, and propagating the beam to the inside of the optical waveguide while totally reflecting the beam.

According to still another aspect of the present disclosure, there is provided a holographic display including: an optical waveguide through which a beam enters and progresses; a plurality of holographic optical elements (HOEs) configured to propagate the beam entering the optical waveguide inside the optical waveguide while totally reflecting the beam; and a modulator configured to reproduce a holographic image on the progressing beam, and to propagate the beam to the inside of the optical waveguide while totally reflecting the beam.

According to yet another aspect of the present disclosure, there is provided a holographic display method including the steps of: propagating, by a plurality of holographic optical elements (HOEs), a beam entering an optical waveguide inside the optical waveguide while totally reflecting the beam; and reproducing, by a modulator, a holographic image on the progressing beam, and propagating the beam to the inside of the optical waveguide while totally reflecting the beam.

Advantageous Effects

According to embodiments of the present disclosure as described above, an optical waveguide display for showing an AR holographic can be implemented as a small and simple system, by using an optical waveguide and an HOE.

BEST MODE

Hereinafter, the present disclosure will be described in more detail with reference to the drawings.

An embodiment of the present disclosure suggests a method of configuring an AR holographic display by using an optical waveguide and a holographic optical element (HOE).

Specifically, an embodiment of the present disclosure suggests a method of adding HOEs to an optical waveguide and a method of processing HOEs to be added, in order to implement, as a small and simple system configuration, an optical waveguide display for providing AR as a hologram.

Figure 2:
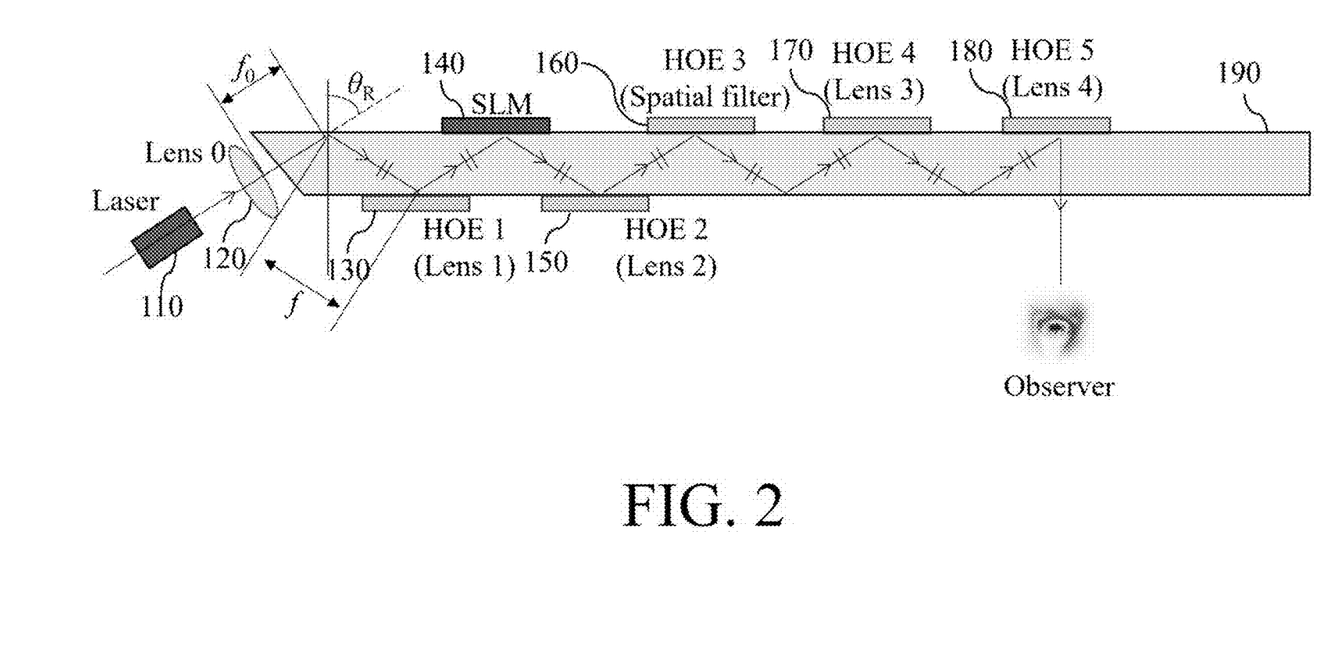
FIG. 2 is a view illustrating a configuration of an AR holographic display which uses an optical waveguide.

FIG. 2 shows a system configuration of an AR holographic display using an optical waveguide. The configuration of FIG. 2 uses an optical waveguide 190 in the same configuration as the holographic display of the viewing window method of FIG. 1.

A laser beam emitted from a laser module 110 passes through a lens 0 120, and then, enters the optical waveguide 190. Since an incident angle $\theta_R$ is larger than a total reflection angle, after entering, the laser beam progresses inside the optical waveguide 190 while performing total reflection. The lens 0 120 converges the laser beam emitted from the laser module 110 and then diffuses the laser beam, thereby allowing the laser beam to enter the inside of the optical waveguide 190.

An HOE 1 130 may be attached to a lower side of the optical waveguide 190 to perform the function of the lens 1 of FIG. 1. That is, the HOE 1 130 may collimate the beam which passes through the lens 0 120 and is reflected from an upper side of the optical waveguide 190, and then enters, and may totally reflect the collimated laser beam and may allow the beam to enter a reflective SLM 140.

The reflective SLM 140 may be attached to an upper side of the optical waveguide 190 to reproduce a holographic image with the incident laser beam, and may totally reflect the beam toward a lower side of the optical waveguide 190 and may propagate the beam to the inside the optical waveguide 190.

The beam reflected from the reflective SLM 140 propagates by a distance of $f$, and then, reaches an HOE 2 150 attached to a lower side of the optical waveguide 190. The HOE 2 150 may perform the role of the lens 2 of FIG. 1. Accordingly, the HOE 2 150 totally reflects the beam, which is totally reflected from the reflective SLM 140 and enters, toward an HOE 3 160.

The HOE 3 160 may be attached to an upper side of the optical waveguide 190. An out-coupler may be recorded on only part of an HOE. The HOE 3 160 may function as a spatial filter in such a way that a beam is totally reflected on an area where the out-coupler is not recorded and continuously progresses to the inside of the optical waveguide 190, and an area where the out-coupler is recorded emits light to the outside and does not propagate anymore.

After the laser beam progresses by $2f$, an HOE 4 170 may performs the role of the lens 3 of FIG. 1, and, after the laser beam progresses by $2f$ again, an HOE 5 180 serving as an out-coupling lens may perform the role of the lens 4 of FIG. 1 to show a hologram of a viewing window method to an observer.

Specifically, the HOE 4 170 transforms the beam which enters after being totally reflected from the HOE 3 160 and then totally reflected from a lower side of the optical waveguide 190 into parallel beam, and totally reflects the beam to a lower side of the optical waveguide 190, and the HOE 5 180 converges the beam which enters after being totally reflected from the HOE 4 170 and then totally reflected from a lower side of the optical waveguide 190, and totally reflects the beam to a lower side of the optical waveguide 190 and transmits the beam to an observer.

When the system is configured as described above, all elements except for the lens 0 120 may be configured in the form of the optical waveguide 190, so that a small and simple system can be configured.

FIGS. 3 to 8 illustrate methods of recording on HOEs for configuring the optical waveguide 190 of FIG. 2. FIGS. 3 to 8 illustrate methods for generating a volume grating by interference between two light waves inside each HOE, in which a post-treatment like curing should be performed after each exposing process.

Figure 3:
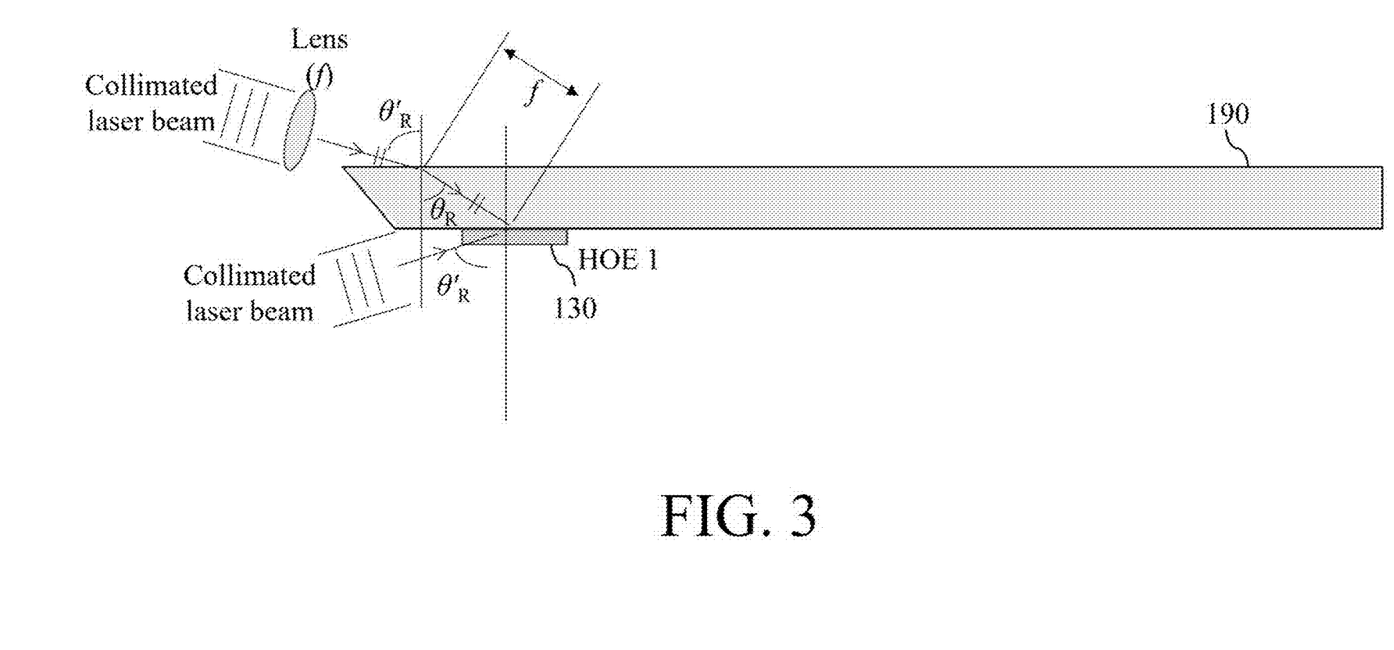
FIG. 3 is a view illustrating a method of recording on HOE 1.

FIG. 3 shows a method of recording on the HOE 1 130. The HOE 1 130 makes wave fronts which are the same (simulate) as convergent light from the lens 0 120 and plane waves progressing toward the reflective SLM 140, respectively, at the outside and allows the wave fronts to enter, and the HOE may record the wave fronts by being exposed to the wave fronts simultaneously, and the HOE 1 may have an incident angle $\theta'_R$ according to the Snell's law in order to maintain a reflection angle $\theta_R$ inside the waveguide, and should allow a beam to enter from the outside.

Figure 4:
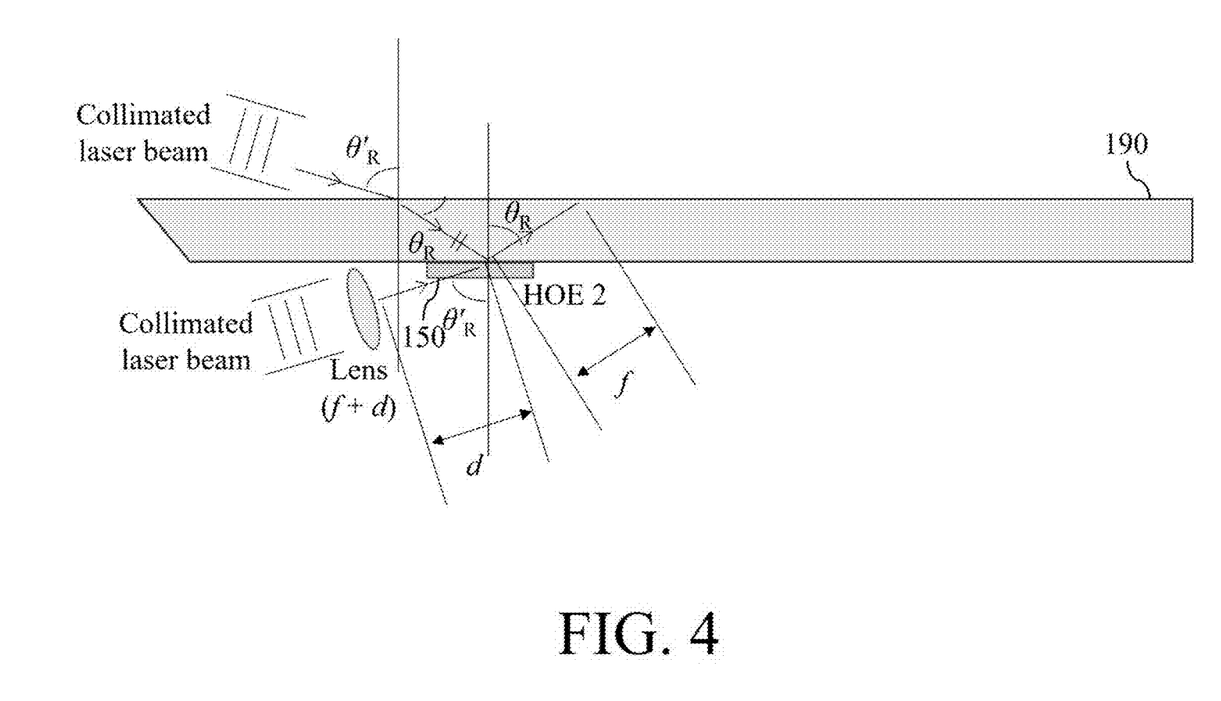
FIG. 4 is a view illustrating a method of recording on HOE 2.
Figure 5:
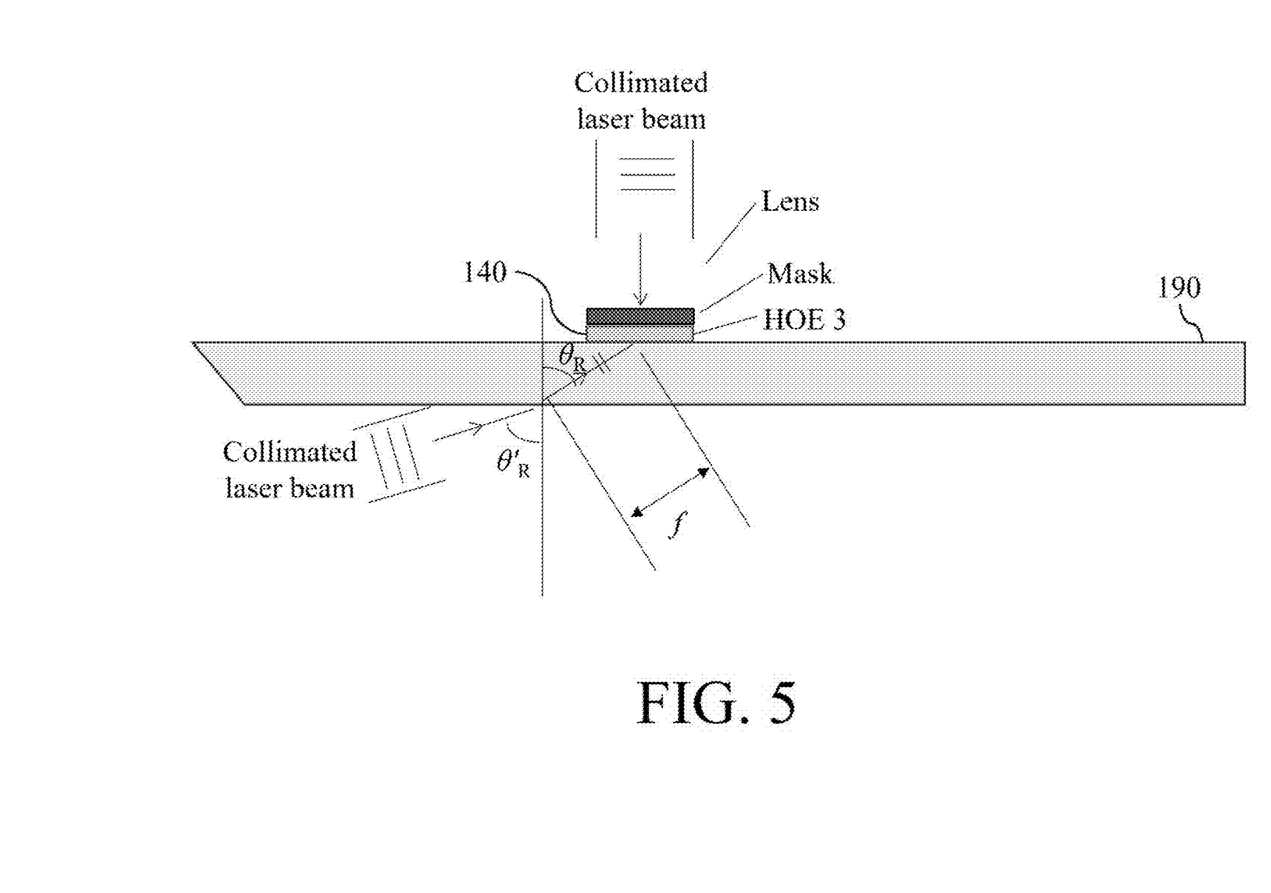
FIG. 5 is a view illustrating a method of recording on HOE 3.

FIG. 4 shows a method of recording on the HOE 2 150. The HOE 2 150 makes wave fronts which are the same as plane waves corresponding to diffraction light from the reflective SLM 140, and convergent light corresponding the lens 2, respectively, at the outside and allows the wave fronts to enter, and the HOE may record the wave fronts by being exposed to the wave fronts simultaneously, FIG. 5 shows a method of recording on the HOE 3 160. The HOE 3 160 serves to perform spatial filtering with respect to wave fronts reflected from the HOE 2 150. To achieve this, wave fronts for simulating the wave fronts reflected from the HOE 2 150 are made to enter the optical waveguide 190 as plane waves, and simultaneously, plane waves progressing vertically from top to bottom are made to enter the HOE 3 160 in order to outcouple some of the plane waves.

An area where waves are outcoupled may serve as a filter, and wave fronts of an outcoupling direction that enter the HOE 3 160 may be masked in order to let only part of the whole area of the HOE 3 160 serve as a filter.

Figure 6:
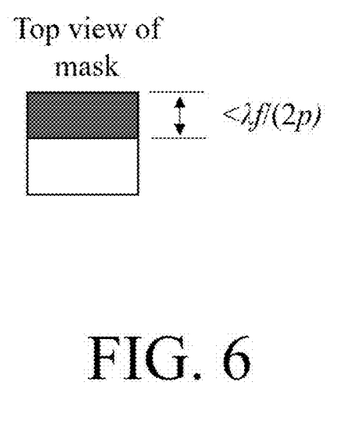
FIG. 6 is a view illustrating a mask which is used for recording on HOE 3.

As shown in FIG. 6, a mask may have the opposite shape to that of a spatial bandpass filter, and, if a pixel size of the reflective SLM 140 is p and a wavelength of a used laser is $\lambda$, an area having a width of $\lambda f/(2p)$ is masked according to a single-band encoding direction of a hologram content.

Figure 7:
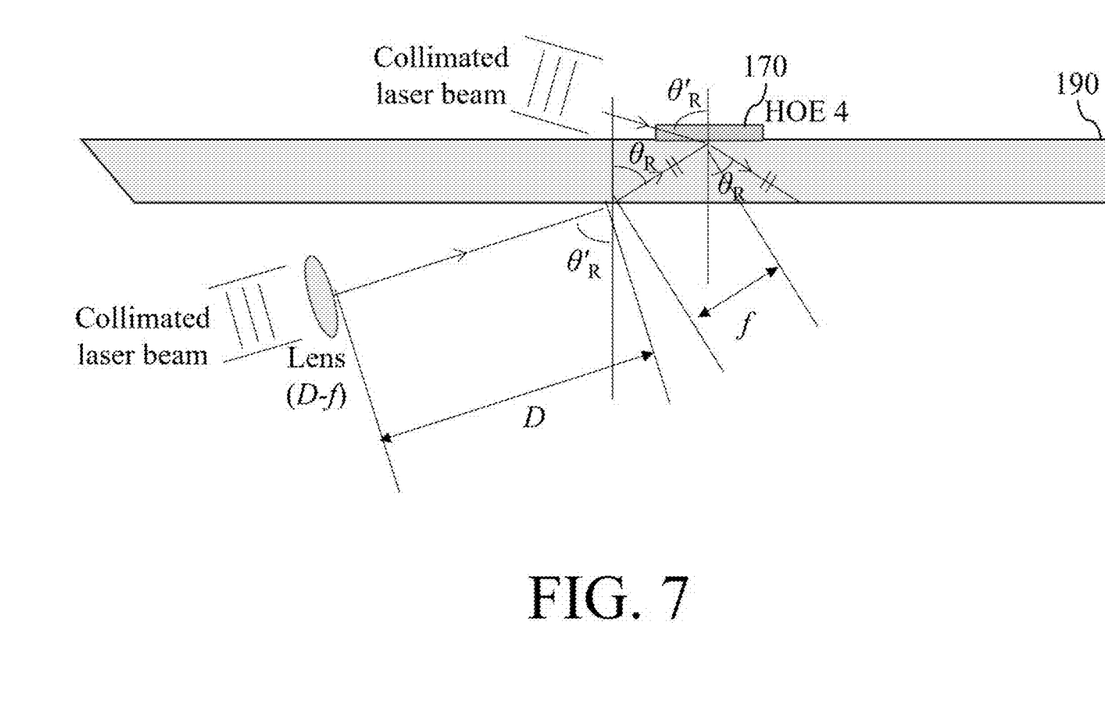
FIG. 7 is a view illustrating a method of recording on HOE 4.

FIG. 7 shows a method of recording on the HOE 4 170. The HOE 4 170 is an HOE that receives filtered wave fronts from the HOE 3 160 and performs the role of the lens 3, and FIG. 7 shows recording by a lens that has a focal distance of 2f to have a magnification of two times as shown in FIG. 1.

Wave fronts simulating the wave fronts progressing from the HOE 3 160 may be provided as diffusing spherical waves, and collimated laser beams may be collected on the lens from the outside and may be made to enter, and in this case, a propagation distance of the diffusing spherical waves after being collected to the HOE 4 170 is adjusted to have 2f. On the other hand, wave fronts simulating the wave fronts that collide with the HOE 4 170 and progress are made to enter as plane waves, and interference between the two wave fronts is recorded on the HOE 4 170.

Figure 8:
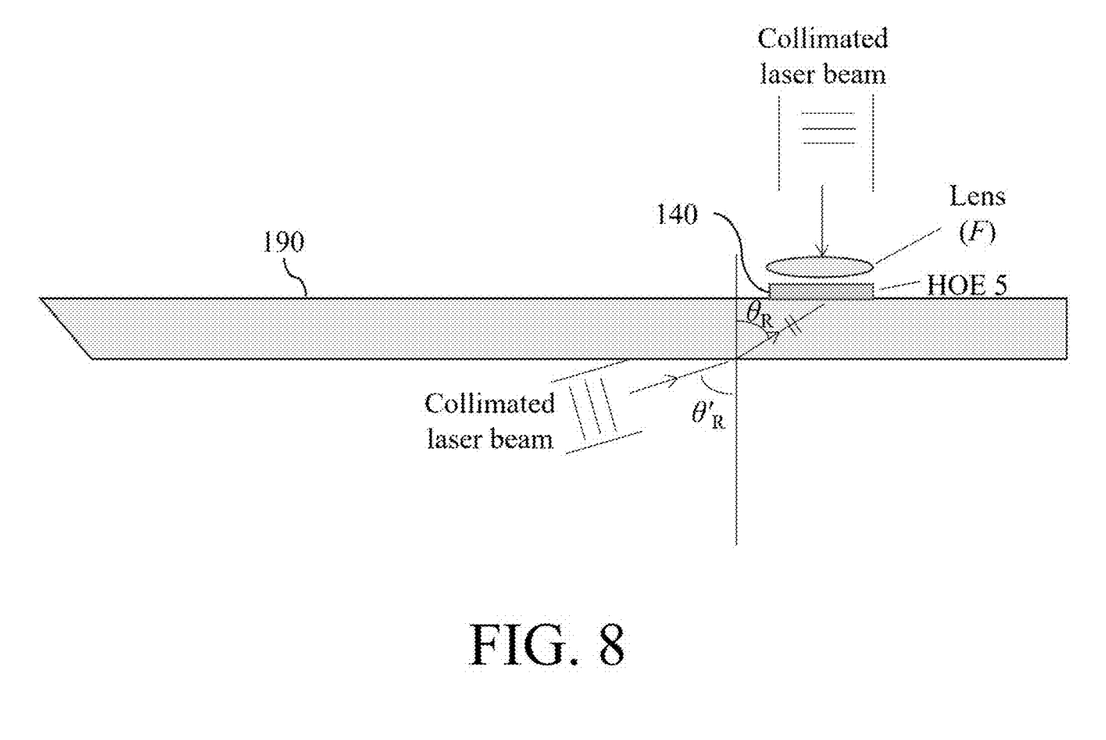
FIG. 8 is a view illustrating a method of recording on HOE 5.

FIG. 8 shows a method of recording on the HOE 5 180. The HOE 5 180 may finally perform the function of the lens 4 to collect the wave fronts propagated from the HOE 4 170 to form a viewing window, and simultaneously, may perform a function of letting beams escape from the waveguide toward observer's pupil and be outcoupled.

To achieve this, wave fronts simulating the wave fronts propagated from the HOE 4 170 may be provided from the outside as plane waves, and wave fronts for collecting and outcoupling are collected through a lens having a focal distance of F and are made to enter in a direction perpendicular to the waveguide.

Up to now, the AR holographic display using the optical waveguide 190 and the HOEs has been described with reference to preferred embodiments.

The AR holographic display according to embodiments of the present disclosure suggests, as a small and simple system configuration, the configuration of the optical waveguide 190, which shows a hologram image through AR, by using HOEs.

The technical concept according to embodiments of the present disclosure may be applied to implementation of a virtual reality (VR) holographic display other than the AR display, as it is. That is, it should be recognized that the AR display suggested in the above-described embodiments is merely an example.

The technical concept suggested in embodiments of the present disclosure may be applied to holographic waveguide displays of other types, in addition to the AR display, the VR display.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A holographic display comprising:
a light source module configured to emit a beam;
an optical waveguide through which the emitted beam enters and progresses;
a plurality of holographic optical elements (HOEs) configured to propagate the beam entering the optical waveguide inside the optical waveguide while totally reflecting the beam; and
a modulator configured to reproduce a holographic image on the progressing beam, and to propagate the beam to the inside of the optical waveguide while totally reflecting the beam,
wherein the HOEs comprise a first HOE which is attached to the other side of the optical waveguide to transform a beam, which enters after passing through the lens and being reflected from one side of the optical waveguide, into a parallel beam, and to totally reflect the beam toward the other side of the optical waveguide,
wherein the HOEs further comprise a second HOE which is attached to the other side of the optical waveguide to converge the beam which is totally reflected from the modulator and enters, and to totally reflect the beam toward one side of the optical waveguide, and wherein the HOEs further comprise a third HOE which is attached to one side of the optical waveguide to diffuse only part of the beam which is totally reflected from the second HOE and enters, and to totally reflect the beam toward the other side of the optical waveguide.

2. The holographic display of claim 1, further comprising a lens configured to converge and then diffuse a beam emitted from a laser, and to allow the beam to enter the optical waveguide.

3. The holographic display of claim 2, wherein the modulator is attached to one side of the optical waveguide to reproduce a holographic image on the beam totally reflected from the first HOE and entering, and to totally reflect the beam toward the other side of the optical waveguide.

4. The holographic display of claim 1, wherein the third HOE is divided into:
a total reflection area configured to diffuse and totally reflect part of the entering beam toward the other side of the optical waveguide; and
a transmission area on which an out-coupler is recorded to transmit the rest of the entering beam to an outside.

5. The holographic display of claim 4, wherein the third HOE is configured to make wave fronts simulating respective entering beams, respectively, at an outside, and to allow the wave fronts to enter, and to allow a wave front simulating an emitted beam to enter a mask which is attached to an upper portion of the third HOE and is divided into a total reflection area and a transmission area, and to be recorded.

6. The holographic display of claim 1, wherein the HOEs comprise:
a fourth HOE configured to transform the beam, which is totally reflected from the third HOE and then is totally reflected from the other side of the optical waveguide and enters, into a parallel beam, and to totally reflect the beam toward the other side of the optical waveguide; and
a fifth HOE configured to converge the beam, which is totally reflected from the fourth HOE and then is totally reflected from the other side of the optical waveguide and enters, to totally reflect the beam toward the other side of the optical waveguide, and then to transmit the beam.

7. The holographic display of claim 6, wherein the first HOE, the second HOE, the fourth HOE, and the fifth HOE are configured to make wave fronts simulating an entering beam and a reflected beam, respectively, at an outside, and to allow the wave fronts to enter and to record.

8. A holographic display method comprising:
emitting, by a light source module, a beam and allowing the beam to enter an optical waveguide;
propagating, by a plurality of holographic optical elements (HOEs), the beam entering the optical waveguide inside the optical waveguide while totally reflecting the beam; and
reproducing, by a modulator, a holographic image on the progressing beam, and propagating the beam to the inside of the optical waveguide while totally reflecting the beam,
wherein the HOEs comprise a first HOE which is attached to the other side of the optical waveguide to transform a beam, which enters after passing through the lens and being reflected from one side of the optical waveguide, into a parallel beam, and to totally reflect the beam toward the other side of the optical waveguide, wherein the HOEs further comprise a second HOE which is attached to the other side of the optical waveguide to converge the beam which is totally reflected from the modulator and enters, and to totally reflect the beam toward one side of the optical waveguide, and wherein the HOEs further comprise a third HOE which is attached to one side of the optical waveguide to diffuse only part of the beam which is totally reflected from the second HOE and enters, and to totally reflect the beam toward the other side of the optical waveguide.

9. A holographic display comprising:
an optical waveguide through which a beam enters and progresses;
a plurality of holographic optical elements (HOEs) configured to propagate the beam entering the optical waveguide inside the optical waveguide while totally reflecting the beam; and
a modulator configured to reproduce a holographic image on the progressing beam, and to propagate the beam to the inside of the optical waveguide while totally reflecting the beam,
wherein the HOEs comprise a first HOE which is attached to the other side of the optical waveguide to transform a beam, which enters after passing through the lens and being reflected from one side of the optical waveguide, into a parallel beam, and to totally reflect the beam toward the other side of the optical waveguide,
wherein the HOEs further comprise a second HOE which is attached to the other side of the optical waveguide to converge the beam which is totally reflected from the modulator and enters, and to totally reflect the beam toward one side of the optical waveguide, and
wherein the HOEs further comprise a third HOE which is attached to one side of the optical waveguide to diffuse only part of the beam which is totally reflected from the second HOE and enters, and to totally reflect the beam toward the other side of the optical waveguide.

10. A holographic display method comprising:
propagating, by a plurality of holographic optical elements (HOEs), a beam entering an optical waveguide inside the optical waveguide while totally reflecting the beam; and
reproducing, by a modulator, a holographic image on the progressing beam, and propagating the beam to the inside of the optical waveguide while totally reflecting the beam,
wherein the HOEs comprise a first HOE which is attached to the other side of the optical waveguide to transform a beam, which enters after passing through the lens and being reflected from one side of the optical waveguide, into a parallel beam, and to totally reflect the beam toward the other side of the optical waveguide,
wherein the HOEs further comprise a second HOE which is attached to the other side of the optical waveguide to converge the beam which is totally reflected from the modulator and enters, and to totally reflect the beam toward one side of the optical waveguide, and
wherein the HOEs further comprise a third HOE which is attached to one side of the optical waveguide to diffuse only part of the beam which is totally reflected from the second HOE and enters, and to totally reflect the beam toward the other side of the optical waveguide.

11. The holographic display method of claim 10, further comprising a lens configured to converge and then diffuse a beam emitted from a laser, and to allow the beam to enter the optical waveguide.

12. The holographic display method of claim 11, wherein the modulator is attached to one side of the optical waveguide to reproduce a holographic image on the beam totally reflected from the first HOE and entering, and to totally reflect the beam toward the other side of the optical waveguide.

13. The holographic display method of claim 10, wherein the third HOE is divided into:
- a total reflection area configured to diffuse and totally reflect part of the entering beam toward the other side of the optical waveguide; and
- a transmission area on which an out-coupler is recorded to transmit the rest of the entering beam to an outside.

14. The holographic display method of claim 13, wherein the third HOE is configured to make wave fronts simulating respective entering beams, respectively, at an outside, and to allow the wave fronts to enter, and to allow a wave front simulating an emitted beam to enter a mask which is attached to an upper portion of the third HOE and is divided into a total reflection area and a transmission area, and to be recorded.

15. The holographic display method of claim 10, wherein the HOEs comprise:
- a fourth HOE configured to transform the beam, which is totally reflected from the third HOE and then is totally reflected from the other side of the optical waveguide and enters, into a parallel beam, and to totally reflect the beam toward the other side of the optical waveguide; and
- a fifth HOE configured to converge the beam, which is totally reflected from the fourth HOE and then is totally reflected from the other side of the optical waveguide and enters, to totally reflect the beam toward the other side of the optical waveguide, and then to transmit the beam.

16. The holographic display method of claim 15, wherein the first HOE, the second HOE, the fourth HOE, and the fifth HOE are configured to make wave fronts simulating an entering beam and a reflected beam, respectively, at an outside, and to allow the wave fronts to enter and to record.

* * * * *